No. 859,662. PATENTED JULY 9, 1907.
F. HUMPHRIS.
DRIVING GEAR.
APPLICATION FILED MAY 1, 1905.
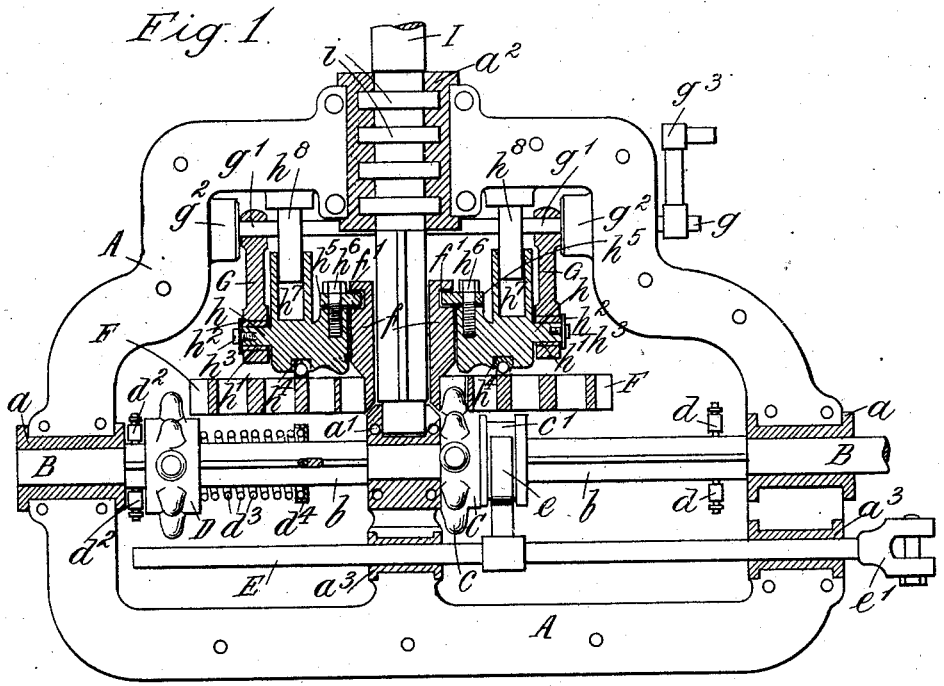

UNITED STATES PATENT OFFICE.

FRANK HUMPHRIS, OF LONDON, ENGLAND.

DRIVING-GEAR.

No. 859,662.　　　Specification of Letters Patent.　　　Patented July 9, 1907.

Application filed May 1, 1905. Serial No. 258,381.

*To all whom it may concern:*

Be it known that I, FRANK HUMPHRIS, a subject of the King of Great Britain, residing at 192 Goldhawk Road, Shepherd's Bush, in the county of London, England, have invented new and useful Improvements in or Connected with Driving-Gear, of which the following is a specification.

This invention relates to improvements in or connected with driving gear specially suitable for motor cars, and the like, more especially to variable speed gear, and has for its objects to make provision for greater diversity in the relative speeds of the gear members than has heretofore ordinarily been the case, and at the same time to attain increased cheapness of construction, strength, lightness and efficiency, and to reduce the number of parts to a minimum.

In order that the said invention may be clearly understood and readily carried into effect, I will now describe the same more fully with reference to the accompanying drawings in which:—

Figure 1 is a top view, and Fig. 2 a side elevation, both partly in section, of a variable speed gear constructed in accordance with my invention for use on a motor road vehicle; Fig. 3 is a face elevation of the gear disk. Fig. 4 is a vertical section, taken approximately on the line 4—4 of Fig. 5 and on a larger scale of a portion of the gear disk and pinion; and, Fig. 5 is a plan of Fig. 4.

Like letters of reference indicate similar parts throughout the several views.

A. is a framework which supports the driving gear, being provided with bushes or bearings in which the principal moving parts work.

B. is the pinion shaft, C. the forward driving pinion and D. the reversing pinion, these pinions being both slidably mounted on angular parts $b$ $b$ of the shaft B. The pinion C. is provided with the radial bell or helmet shaped teeth $c$ which, as shown, are of circular shape in cross section and are widened at their bases, and taper gradually in curvilinear fashion towards their heads or outer extremities, where they are hemispherical or dome-shaped. Formed integrally with, or secured to, the pinion C. is a boss having a circumferential groove $c^1$ serving a purpose hereinafter described. The conformation of the teeth on pinion D. is similar to that of the teeth $c$.

F is the speed disk, shown separately in Fig. 3 in elevation, and partly in Fig. 4 in section. The said disk is provided, as shown, with holes which are arranged in concentric circular series and are all beveled in such manner that the teeth on the pinion C. can readily enter and leave them without clash or friction. For this purpose, the interior of each hole is approximately similar in shape to the exterior of the lower part of a bell; that is to say, the shape is such that a section of the disk taken in any direction through the center of a hole as in Fig. 4, would show the opposite sides or walls of the hole convex in contour and gradually approaching each other towards the inner end. This arrangement insures that the point of contact of the tooth with the side of the hole travels from the base to near the tip thereof, the relative motion between the tooth and the side of the hole somewhat resembling that of the periphery of a frictional gear wheel moving without slip over the periphery of its companion wheel. All that part of the pinion tooth which lies radially beyond the pitch line is hemispherical, while that part thereof which lies on the other side; viz, the inner side of the pitch line, has its sides shaped on long parabolic curves extending to the extreme base of the tooth. As to the holes, each of these is cylindrical or of any optional shape (as may most conveniently be formed) below the pitch line of the hole, that is, on the side of the pitch line remote from the pinion, but the longitudinal contour of the sides of the hole above the pitch line is such that said sides are continuously curved longitudinally in a parabolic outline, the curvature being sharper than the longitudinal curvature of the teeth so that the hole not only increases in diameter towards the pinion, but increases in the proper geometrical ratio so that every point of the longitudinal curvature of the hole will approach the corresponding point of the tooth at exactly the right time. By thus making the hole parabolically curved on a sharper curve than that of the tooth, allowance is made not only for the increasing thickness of the tooth but for the progress of the hole and the tooth relatively to each other, with the result that from the moment of the first contact of the tooth with the sides of the hole to the moment of its final exit therefrom, it rolls over the surface of the hole without any surface sliding. When it is desired to change the speed ratio of the gear, or to reverse the same, the disk F. and pinion C. are first disengaged from each other by longitudinally retracting the disk so as to draw it out of reach of the teeth on the pinion. The pinion is then shifted longitudinally upon its shaft by means of a sliding rod E. carrying a fork $e$ which partially embraces loosely the grooved part $c'$ of the boss of pinion C, said rod being provided at its outer end with any suitable contrivance $e^1$, for connecting it with a lever or other hand operated device under the control of the driver. To permit the above series of movements, the boss $f$, by which the disk F. is carried, is slidably mounted on an angular or splined portion of its shaft I and is actuated by gathering cams G, G, with which latter it is connected through the intervention of a device that serves also as a bearing and stay for the disk. This device comprises an annular block H having radial pins $h$ with which the cams G respectively engage, the bosses $g$ $g$ of said cams being keyed on a transverse rocking shaft $g^1$ turning in bearings $g^2$ $g^2$ and provided with a lever arm $g^3$. Bushes $h^1$ $h^1$ are interposed between the pins $h$ and the cams G, and said cams and bushes are kept in place by washers $h^2$ $h^2$ and screws $h^3$ $h^3$. An annular ball race $h^4$ and balls therein constitute an antifrictional bearing between the disk F and the block H. The movements of said block are transmitted to the disk by means of studs $h^5$ which are secured to the block by screws $h^6$ and engage loosely in a circumferential groove $f^1$ in the boss $f$, said movements being guided by means of cylindrical sockets $h^7$ formed integral therewith which slide freely over studs $h^8$ fixed on the frame A. The longitudinal thrust of the shaft I is resisted by its rings $i$ socketed in the thrust block $a^2$ in the well known way.

It will be noticed that the operative portion of the cam G, in which the pin $h$ slides, is cut in the form of a helical or parabolic curve the lower end of which is nearer to the center of motion than the upper end. It is important also to observe that the upper portion $g^4$ of the cut-out part or pin-path, that is to say, the portion in which the pin $h$ rests when the disk F is in its normal position of engagement, is in the form of an arc of a circle centered in the rocking shaft $g$, the effect of this arrangement being to prevent said pin from being accidentally slid along its path and, consequently, to hold the disk F. properly to its work.

When it is desired to reverse the gear, the pinion C is shifted until entirely clear of the disk, and the other pinion D is brought into action. To effect this, I arrange in, and near the extremity of the path of pinion C, studs $d$ $d$ which are connected by means of a sliding bar $d'$ with similar studs $d^2$, $d^2$, abutting against the more remote face of pinion D. When the pinion C collides against the studs $d$, its further movement will cause it to push them in a direction parallel with the shaft B, and thereby similarly move the slide $d'$, studs $d^2$ and reversing pinion. This pinion then slides, in opposition to the resistance of a spring $d^3$, into a position in which it can engage with the circumferential teeth of the disk F. The spring $d^3$ presses freely at one end against the pinion D, while its other end rests against a recessed stop $d^4$ fixed on the shaft B: and the said stop serves, when released by the rod E, to return the pinion D to its normal or inoperative position.

I am aware that it has already been proposed to construct variable speed gear in the form of a pinion having radial pin teeth that engage in holes arranged in concentric series in the face of a corresponding disk, but devices of this kind as heretofore contrived have not been satisfactory, or even practicable, owing to the said teeth and holes having been of such a character relatively to each other that the teeth were not able to enter and leave the holes. I do not, therefore, claim such an arrangement broadly, but,

Having thus described my invention, what I claim and desire to secure by Letters Patent is:—

1. In driving gear and pinion having teeth whose contour beyond the pitch line is partially spherical and whose sides on the inner side of the pitch line diverge towards the center in slow, continuous, parabolic curves extending longitudinally of the tooth to the base of the tooth, in combination with a perforated disk the holes of which are of such contour that on one side of the pitch line their sides diverge towards the pinion in continuous parabolic curves somewhat sharper than the longitudinal curvature of the teeth so that in all positions of engagement of any tooth with any hole the longitudinally curved parts of the tooth and the hole are tangentially in contact with each other at the pitch line.

2. Variable speed gear comprising a pinion having its teeth circular in any transverse section and shaped in two converging parabolic curves in any longitudinal section, said teeth being broader at the base than the spaces between the teeth, and said spaces being concavely curved, in combination with a disk having concentric series of holes which are circular in any transverse section and shaped in diverging curves in any longitudinal section above the pitch line, said curves being sharper than the longitudinal curves of the sides of the teeth, the spaces between the holes being narrower than any diameter of the holes.

3. Variable speed gear comprising a pinion whose teeth are continuously curved up the sides and over the top and are broader at the base than the distance at that point between two successive teeth, in combination with a flat disk having a plurality of concentric rows of holes which are flared at their mouths, the holes in any one row being identical in size and shape with the holes in any other row, and being wider in diameter at their narrowest part than the distance between any two successive holes of the same row.

4. In variable speed driving gear, the combination of a longitudinally slidable disk having a plurality of concentric series of perforations in its face, a rocking shaft, a cam mounted on said shaft and having a helical slot, a pin or stud slidable in said slot, means for operatively connecting said pin with the aforesaid disk, a longitudinally slidable pinion having bell or helmet shaped teeth capable of intermeshing with said perforations, and means for longitudinally sliding said pinion.

5. In variable speed driving gear, the combination with a facially perforated disk and a longitudinally slidable pinion having pin teeth, of a keyed shaft on which said pinion can slide, a reversing pinion on said shaft, also slidable means for disengaging the disk and pinion from each other, means for sliding said pinion along its shaft, a movable abutment in the path of said pinion, and means for operatively connecting said abutment with the reversing pinion.

FRANK HUMPHRIS.

Witnesses:
GEO. S. VAUGHAN,
WALTER J. SKERTEN.